United States Patent [19]

Wood et al.

[11] 4,278,181

[45] Jul. 14, 1981

[54] SAFETY PRESSURE RELIEF DEVICE

[75] Inventors: Loren E. Wood; Jerome D. Allen, both of Tulsa; Miner E. Clift, Broken Arrow; Jerry W. Kays; Calvin C. Forsythe, both of Tulsa, all of Okla.

[73] Assignee: BS & B Safety Systems, Inc., Tulsa, Okla.

[21] Appl. No.: 936,868

[22] Filed: Aug. 25, 1978

[51] Int. Cl.³ .............................................. F16K 17/40
[52] U.S. Cl. .................................. 220/89 A; 13/68 R
[58] Field of Search ........................... 220/89 A, 89 B; 137/68 R, 67

[56] References Cited

U.S. PATENT DOCUMENTS

| 3,685,686 | 8/1972 | Raidl | 220/89 A |
| 3,693,691 | 9/1972 | Summers | 220/89 A |
| 3,698,598 | 10/1972 | Wood et al. | 220/89 A |
| 3,722,734 | 3/1973 | Raidl, Jr. | 220/89 A |
| 4,158,422 | 6/1979 | Witten et al. | 220/89 A |

Primary Examiner—Joseph Man-Fu Moy
Attorney, Agent, or Firm—Laney, Dougherty, Hessin & Beavers

[57] ABSTRACT

A safety pressure relief device is provided for the venting of fluid pressure between first and second pressure zones. The relief device includes a first rupture disk having a flexible sealing membrane located on one side thereof, and a knife means located on the other side of the first rupture disk. The first rupture disk includes a plurality of arcuate slots circumscribing a substantially circular blowout portion. The knife means includes a circular cutting blade located radially inward of the arcuate slots. Upon rupture of the first rupture disk, due to excess pressure in the second pressure zone, the substantially circular blowout portion passes through a circular opening in the knife means, allowing the flexible sealing membrane to contact the cutting blade and be severed thereby. Alternative embodiments add a second rupture disk to relieve excess fluid pressure from the first pressure zone to the second pressure zone.

5 Claims, 9 Drawing Figures

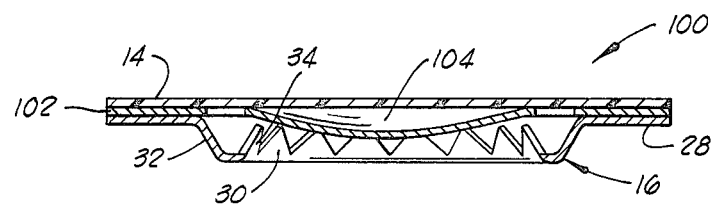
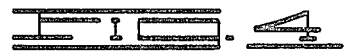
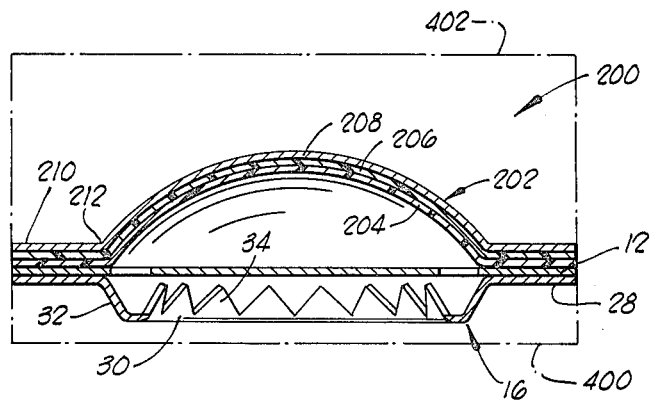
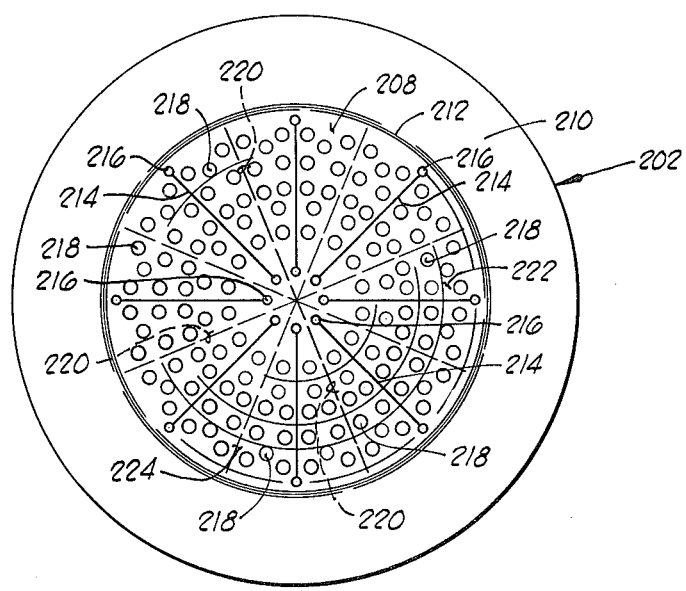

SAFETY PRESSURE RELIEF DEVICE

BACKGROUND OF THE INVENTION

1. Field of the Invention

This invention relates generally to safety pressure relief devices, and more particularly, but not by way of limitation, to a safety pressure relief device designed for positive rupture in both the normal and reverse rupture modes at pre-determined normal and reverse rupture pressure differentials, with the pre-determined reverse rupture pressure differential being relatively lower than that which could previously be predictably achieved by the prior art.

2. Description of the Prior Art

A variety of safety pressure relief devices of the rupture disk type have been developed. Generally, these devices include a rupture disk supported between a pair of complementary supporting members or flanges which are in turn connected to a relief connection in a vessel or system containing fluid pressure. When the fluid pressure within the vessel or system exceeds the design pressure of the rupture disk, rupture occurs allowing fluid pressure to be relieved from the vessel or system.

Although prior art devices have been designed for failure in either direction, see e.g. U.S. Pat. No. 3,091,359 to Wood, the rupture disk devices of the prior art have typically been designed for failure primarily in one direction. That is if the rupture disk is to be installed in a pressurized system between first and second pressure zones, and it is contemplated that the excess pressure will normally occur in the first zone and be desirably vented to the second zone, the rupture disk is designed to be installed at such an orientation that it will fail due to excess pressure on the side of the disk adjacent the first zone. This is referred to as the normal mode of failure.

A problem sometimes occurs, however. Although the system may be designed so that in its normal operation the excess pressure will occur in the first zone, a situation may occur where the excess pressure is in the second zone. For example, a typical installation of the relief device of the present invention is to install it for normal venting of excess pressure from inside a petrochemical storage tank to the atmosphere. There normally is a pressure inside the tank greater than atmospheric pressure, due to the fluid stored therein, and the disk may normally be installed for rupture due to excess pressure within the tank. However, the situation may occur where the fluid is being drawn from the tank thereby pulling a vacuum in the tank and causing the excess pressure to be external of the tank. In such a situation it is desirable that this excess pressure external of the tank be relieved so as to prevent the tank from collapsing due to the internal vacuum. Although relatively large diameter rupture disks have sometimes been used by the prior art to protect these tanks from an internal vacuum, many of the more conventionally sized rupture disk designs of the prior art cannot be satisfactorily controlled when failing in this reverse direction and thereby may permit unsafe conditions to occur.

One previous attempt to provide a relief apparatus designed to relieve excess pressure in both directions is that shown in U.S. Pat. No. 3,091,359 to Wood, mentioned above. That device has certain limitations which are overcome by the present invention. The minimum rupture pressures which can predictably be achieved by the '359' device are considerably higher than those of the present invention, as will be explained in more detail later. Also, experience has shown that the '359' apparatus will provide a total rupture of both its disks in the reverse mode only if the design rupture pressure in the normal direction is not greater than twice the design rupture pressure in the reverse mode. Otherwise, the normal mode rupture disk will generally not reverse and rupture when the reverse mode rupture disk ruptures.

These problems are overcome by the rupture disk assembly of the present invention by providing a composite disk designed for positive rupture in both the normal and reverse directions at different pre-determined normal and reverse pressure differentials. A novel structure is provided which assures predictable rupture in the reverse mode at pressure differentials considerably lower than can be achieved by the prior art devices. Also, by combining two of the rupture disks of the present invention face to face, a combination disk is provided which assures rupture in either direction. For proper operation of this combination the two rupture disks should be designed to rupture at the same pressure differentials.

In one embodiment of the present invention, those portions of the assembly providing for rupture in the normal direction are provided by a conventional concave-convex rupture disk having a plurality of radial slits therein in combination with a flexible sealing member. Similar apparatus for failure in the normal mode are described in U.S. Pat. No. 2,953,279 to Coffman and U.S. Pat. No. 3,698,598 to Wood et al. This embodiment of the present invention, when failing in the normal direction, operates in a similar manner to Coffman. When the concave-convex disk ruptures outwardly, splitting into a plurality of triangular petals, the flexible sealing member is burst by the high normal pressure differential.

A particular problem that must be dealt with when designing a composite rupture disk for failure in both the normal and reverse directions is that failure in the reverse direction is typically caused by the drawing of a vacuum in one pressure zone and the pressure differentials encountered are relatively low, although they are sufficient to damage large structures such as oil storage tanks. The problem with these low pressure differentials is the necessity for designing the rupture disk to fail positively and predictably at a given low reverse pressure differential.

The reverse mode rupture disk, of the present invention, having the flexible sealing member on the side adjacent the second pressure zone and the circular cutting blade on the side adjacent the first pressure zone, provides this required positive and predictable rupture at the desired low reverse pressure differential. Neither the Coffman or Wood et al devices provide a means for positive rupture of the flexible sealing member at these low pressure differentials. U.S. Pat. No. 2,095,828 to Nerad shows a circular cutting blade, but it is not used in conjunction with a flexible sealing member and does not involve relief of fluids at low pressure differentials.

SUMMARY OF THE INVENTION

A safety pressure relief device is provided for the venting of fluid pressure between first and second pressure zones. The relief device includes a first rupture disk having flexible sealing membrane located on one side thereof, and a knife means located on the other side of the first rupture disk. The first rupture disk includes a plurality of arcuate slots circumscribing a substantially circular blowout portion. The knife means includes a circular cutting blade located radially inward of the arcuate slots. Upon rupture of the first rupture disk, due to excess pressure in the second pressure zone, the substantially circular blowout portion passes through a circular opening in the knife means, allowing the flexible sealing membrane to contact the cutting blade and be severed thereby. Alternative embodiments add a second rupture disk to relieve excess fluid pressure from the first pressure zone to the second pressure zone.

It is, therefore, an object of the present invention to provide a safety pressure relief device designed for positive rupture at pre-determined pressure differentials in both the normal and reverse directions which are lower than those pressure differentials at which predictable rupture has previously been achieved.

A further object of the present invention is the provision of a rupture disk assembly including a reverse mode rupture disk having a plurality of arcuate slots therein in combination with a flexible sealing member.

Yet a further object of the present invention is the provision of a composite rupture disk assembly having a flexible sealing member in combination with a cutting blade for severing the sealing member upon failure of an intermediate rupture disk.

Another object of the present invention is the provision of a rupture disk having a plurality of slots defining a substantially circular blowout portion, and a flexible sealing member for transferring the forces from a pressure differential to said rupture disk.

And another object of the present invention is the provision of a safety pressure relief device having first and second rupture disks and an intermediate flexible sealing membrane for transferring forces of a normal mode pressure differential to said second rupture disk, and for transferring forces of a reverse mode pressure differential to said first rupture disk, in combination with means for providing positive rupture of the sealing membrane in reverse mode rupture.

Yet another object of the present invention is the provision of a safety pressure relief device having first and second rupture disks and an intermediate flexible sealing membrane, in combination with a knife means located on that side of each rupture disk opposite the flexible sealing membrane, to provide positive rupture of the sealing membrane in either direction at relatively low pressure differentials.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 4 is a sectional elevation view of a second embodiment of the present invention.

FIG. 5 is a sectional elevation view of a third embodiment of the present invention.

FIG. 6 is a plan view of the device of FIG. 5.

DESCRIPTION OF THE PREFERRED EMBODIMENTS

Figure 1:
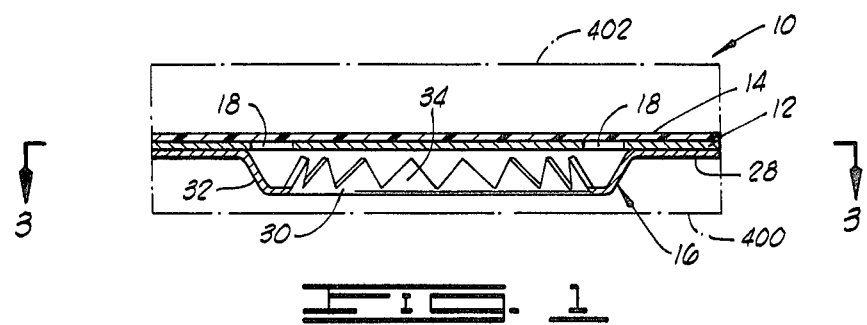
FIG. 1 is a sectional elevation view of the safety relief device of the present invention.

Referring now to the drawings and particularly to FIG. 1, the basic safety pressure relief device of the present invention is shown and generally designated by the number 10.

The relief device 10 includes a flat plate rupture disk 12, having a flexible sealing membrane 14 located on one side thereof, and a knife means 16 located on the other side of rupture disk 12.

The flexible sealing membrane 14 is shown to be flat and located coextensive with rupture disk 12. As will be understood upon a study of the alternative embodiments described below, the membrane 14 may sometimes be preformed, for example to a dome shaped configuration, so as to allow it to conform to the shape of a rupture disk located on either side of the membrane 14. Generally the membrane 14 is preferably preformed to such a dome shaped configuration. Also, the membrane 14 is shown in FIG. 1 without any support member or protective covering on that side opposite rupture disk 12. Depending upon the type of installation, it may be desirable to place a protective covering over that side of membrane 14, similar in concept to the protective covering described below for the alternative embodiment of FIG. 5.

Figure 2:
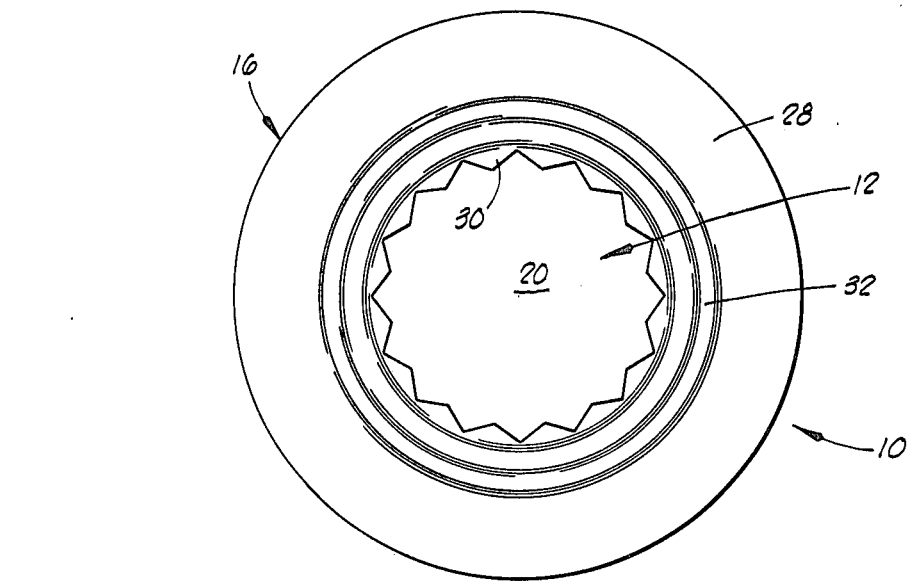
FIG. 2 is a bottom view of the device of FIG. 1.

FIG. 2 shows a bottom view of the device 10 of FIG. 1.

Figure 3:
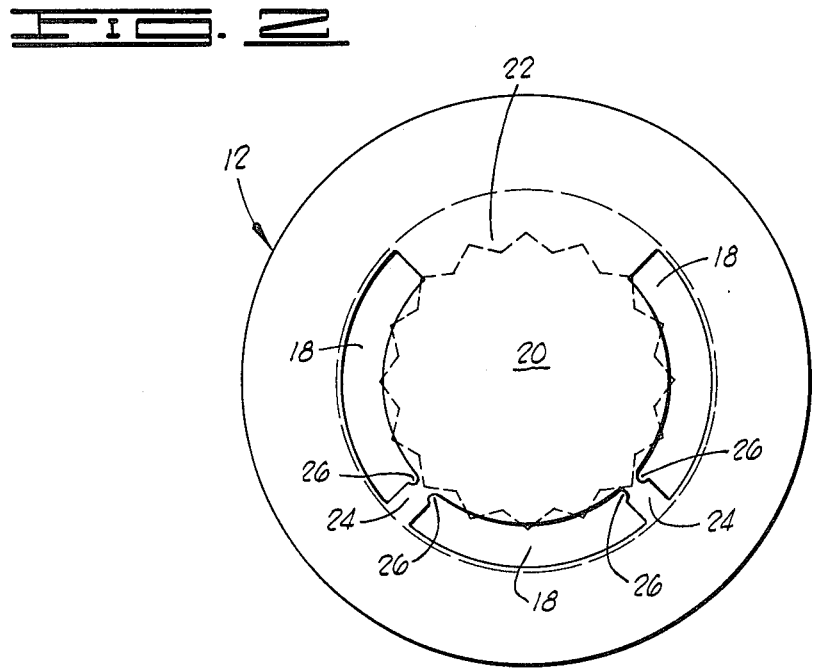
FIG. 3 is a view of the device of FIGS. 1, 5 and 7 taken along lines 3—3.

Referring now to FIG. 3, the rupture disk 12 includes a plurality of arcuate slots or perforations 18 concentrically disposed around its central axis, partially circumscribing and defining a substantially circular blowout portion 20. A portion of the annular area defined by the arcuate slots 18 is left intact to form a retaining hinge 22.

Between the adjacent arcuate slots 18 are located rupture tabs 24. Each of the rupture tabs 24 may include notches 26, the depth of which can be varied to change a pre-determined pressure differential at which rupture of disk 12 will occur.

Located adjacent the rupture disk 12 on the side opposite the flexible sealing member 14 is the knife means 16. The knife means 16 includes a radially outer flange portion 28 and a radially inner circular serrated cutting blade 30, joined to the flange portion 28 by an intermediate annular inverted U-shape connecting portion 32. The radially inner periphery of the knife means 16 defines a substantially circular opening. The serrated cutting blade 30 includes a plurality of cutting teeth 34 located adjacent the periphery of said substantially circular opening. Cutting teeth 34 are inclined inwardly toward rupture disk 12 at an angle in the range of from about 30° to about 45°.

The arcuate slots 18 of the rupture disk 12 are located radially outward of the cutting teeth 34 and radially inward of the flange portion 28 of the knife means 16. The location of the slots 18 radially outward of the cutting teeth 34 prevents the flexible sealing member 14 from extruding through the slots 18 and contacting the cutting teeth 34 causing premature perforation and rupture of the flexible sealing member 14 when subjected to reverse pressure differentials.

Since the diameter of the substantially circular blowout portion 20 is slightly greater than the diameter of the substantially circular opening in the knife means 16, it is necessary that the blowout portion 20 be flexible enough that it can bend a sufficient amount, when subjected to a predetermined pressure differential, to allow it to be displaced through said opening.

Referring now to FIG. 4, an alternative embodiment of the basic safety pressure relief device of the present invention is shown and generally designated by the numeral 100. The device 100 of FIG. 4 is similar to the device 10 of FIG. 1, with like numbers indicating like parts. Device 100 differs from device 10 in that the rupture disk 102 of device 100 is not flat, but rather includes a substantially circular dome shaped blowout portion 104.

FIGS. 5 and 6 show a third embodiment of the present invention which is generally designated by the numeral 200. The first rupture disk 12 and the knife means 16 are the same as the similarly designated elements of device 10 of FIGS. 1–3, with like numerals indicating like features of those elements.

Device 200 also includes a second dome shaped rupture disk 202. Second rupture disk 202 is separated from a flexible sealing membrane 204 by protection element 206.

Second dome shaped rupture disk 202 has a concave-convex portion 208 and a radially outer flange portion 210 joined by a curved transition connection 212.

The concave-convex portion 208 includes a plurality of radially extending slits 214, as best seen in FIG. 6. Each of the radially extending slits 214 terminates in a circular stress relief hole 216 at each end. These slits 214 and holes 216 define the manner in which the second rupture disk 202 will rupture. Concave-convex portion 208 also includes a plurality of flow apertures 218, through which relieved fluid may pass when first rupture disk 12 ruptures, as will be explained in more detail below.

The flexible sealing member 204 is preformed to a dome shape corresponding to the shape of concave-convex portion 208. When a pressure differential forces sealing membrane 204 towards second rupture disk 202, membrane 204 assumes a first position shown in FIG. 5. When the pressure differential is in the opposite direction, the membrane 204 folds and wrinkles and is forced down to a second position against first rupture disk 12.

Protection element 206 separated membrane 204 from second rupture disk 202. It serves to prevent membrane 204 from extruding through any of the slits 214, holes 216 or apertures 218 and being cut or torn thereby.

Protection element 206 is preferably formed from a dome shaped sheet of flexible plastic material somewhat thicker than that of membrane 204, and is slit along lines 220 into a plurality of triangular shape sections 222. The slits 220 are preferably oriented to bisect the angles between adjacent slits 214 in second disk 202, and engage a median portion 224 which does not contain any apertures 218. This is similar to the arrangement shown in U.S. Pat. No. 2,953,279 to Coffman.

FIG. 6 illustrates concave-convex portion 208 as having eight radially extending slits 214 dividing it into eight triangular shaped portions. Similarly, protection element 206 has eight slits 220 dividing it into eight triangular shaped sections 222. The number of triangular sections into which these parts are divided may be varied depending on the particular design application.

Figure 8:
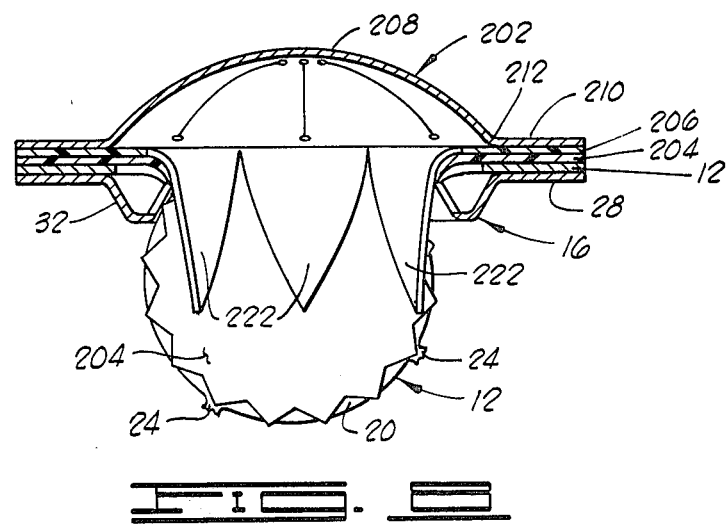
FIG. 8 is a sectional elevation view of the device of FIGS. 5 and 6 after reverse mode rupture.
Figure 9:
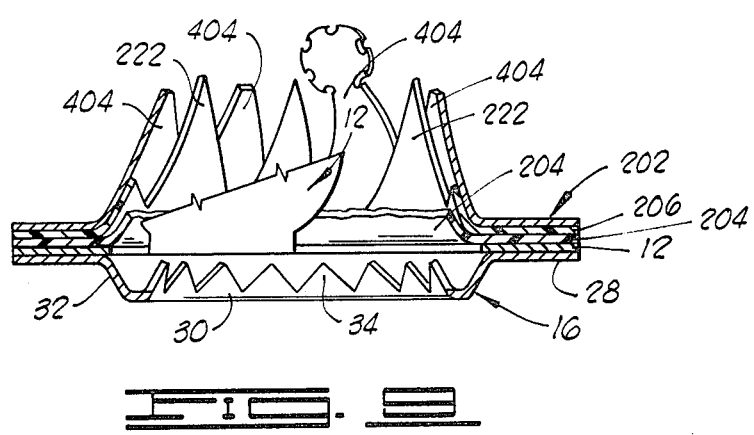
FIG. 9 is a sectional elevation view of the device of FIGS. 5 and 6 after normal mode rupture.

A presently preferred embodiment of the present invention divides concave-convex portion 208 and protection element 206 each into six triangular portions as is illustrated in FIGS. 8 and 9.

Radially outer portions of the sealing membrane 204 and protection element 206 are held between a radially outer portion of first rupture disk 12 and flange portion 210 of second rupture disk 202. Membrane 204 and protection element 206 are illustrated as extending radially outward to the same extent as rupture disks 12 and 202, but it is preferrable that membrane 204 and protection element 206 have an outer diameter less than that of the rupture disks. This permits the rupture disks 12 and 202 and knife means 16 to be spot welded together about their outer periphery. Protection element 206 is preferably taped about its edge to the second rupture disk 202 so that the slits 220 will be properly located relative to the slits 214.

Figure 7:
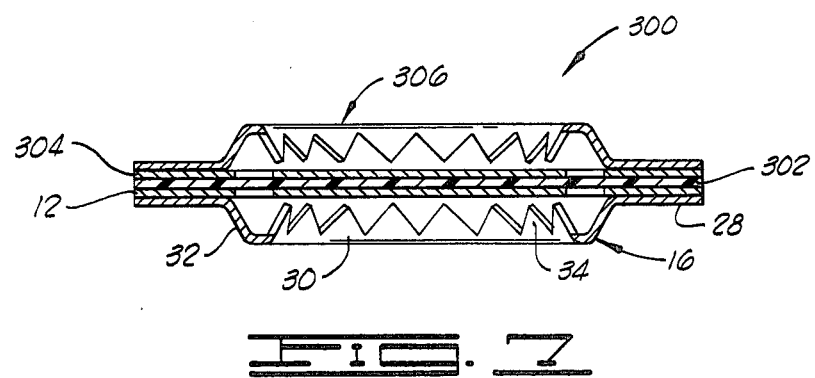
FIG. 7 is a sectional elevation view of a fourth embodiment of the present invention.

Referring now to FIG. 7, a fourth embodiment of the present invention is shown and generally designated by the numeral 300. The first rupture disk 12 and the knife means 16 are the same as the similarly designated elements of device 10 of FIGS. 1–3, with like numerals indicating like features of those elements.

Device 300 further includes a flexible sealing membrane 302, a second rupture disk 304, and a second knife means 306.

The second rupture disk 304 and second knife means 306 are similar to the first rupture disk 12 and knife means 16, respectively, except that second knife means 306 is inverted with respect to first knife means 16.

The sealing membrane 302 is preferably preformed to have a dome shaped interior portion similar to that of membrane 204 of FIG. 5. The dome shaped part of membrane 302 is then folded to a flat configuration prior to installation between rupture disks 12 and 304. This allows the membrane 302 to conform to the shape of either rupture disk 12 or 304 when they bulge out prior to rupture. The dome shape also allows membrane 302 to contact first or second knife means 16 or 306 without having to stretch, thus requiring a lower pressure differential to assure severing a given thickness of membrane 302.

MANNER OF OPERATION

The manner of operation of the present invention will now be described with particular regard to embodiment 200 of FIGS. 5, 6, 8 and 9.

The safety pressure relief device 200 is designed for installation between first and second pressure zones, 400 and 402, respectively, to vent excess pressure from the first zone 400 to the second zone 402 at a predetermined normal mode rupture design pressure differential, and to vent excess pressure from the second zone 402 to the first zone 400 at a predetermined reverse mode rupture design pressure differential.

A controlled positive rupture is provided in either the normal or reverse direction, when the predetermined normal or reverse mode rupture pressure differential is achieved.

In the normal mode of operation, that is with the pressure in the first zone 400 greater than the pressure in the second zone 402, the flexible sealing member 204 is urged toward a first position contacting and coextensive with the concave surface of the second normal mode rupture disk 202, as is illustrated in FIG. 5. This effectively transfers the pressure forces of the normal mode pressure differential to the concave surface of the second normal mode rupture disk 202. When the pressure differential across the sealing member 204 equals the predetermined normal mode rupture pressure differential the tensile forces in the concave-convex portion 208 cause radial tensile failure at those locations between the radially inner stress relief holes 216, so that the concave-convex portion 208 splits into a plurality of triangular petals 404 extending towards the second pressure zone 402 as illustrated in FIG. 9.

The normal mode rupture pressure differential is sufficiently high that the flexible sealing member 204 is burst like a balloon, providing a positive rupture thereof immediately following the rupture of the second dome shaped normal mode rupture disk 202.

Since the normal mode rupture pressure differential is higher than the reverse mode rupture pressure differential, the forces exerted on the first flat plate reverse mode rupture disk 12 will cause a radial tensile failure of the rupture tabs 24 allowing the blowout portion 20 to bend outwardly about retaining hinge 22 in a manner similar but opposite in direction to that illustrated in FIG. 8. This greatly increases the flow area available to the escaping fluids thereby decreasing the time required to vent the excess pressure from the first zone 400.

In the reverse mode of operation, that is with the pressure in the second zone 402 greater than the pressure in the first zone 400, the flexible sealing member 204 is urged toward a second position contacting and coextensive with the first reverse mode rupture disk 12. This effectively transfers the pressure forces of the reverse mode pressure differential to the first reverse mode rupture disk 12. When the pressure differential across the sealing member 204 equals the predetermined reverse mode rupture pressure differential the rupture tabs 24 fail between the notches 26 permitting the substantially circular blowout portion 20 to bend inwardly about retaining hinge 22 towards the first zone 400 as illustrated in FIG. 8.

The blowout portion 20 is constructed for dislocation, from the plane of the first flat plate reverse mode rupture disk 12, upon reverse mode rupture, and is oriented so that upon dislocation it is moved through the substantially circular opening in the knife means 16.

As discussed above, the reverse mode rupture pressure differential is typically based upon a partial vacuum in the first zone 400 with approximately atmospheric pressure present in the second zone 402. The reverse mode rupture pressure differential is, therefore, typically very low relative to the normal mode rupture pressure differential. This reverse mode rupture pressure differential may be so low that the flexible sealing member 204 will not always fail in a positive manner by bursting when the first reverse mode rupture disk 12 ruptures. It might instead merely expand a bit, preventing the desired venting of excess pressure from the second zone 402 to the first zone 400, and allowing an unsafe condition to occur.

This undesirable possibility is eliminated by the provision of knife means 16 with the cutting teeth 34 oriented towards the sealing member 204. When the first reverse mode rupture disk 12 fails and bends inwardly as shown in FIG. 8, the flexible sealing member 204 expands towards the first zone 400 and extends through an opening in first rupture disk 12 created by the dislocation of blowout portion 20. The flexible sealing member 204 contacts the cutting teeth 34 and is severed thereby. This provides a positive reliable rupture of the flexible sealing member 204 immediately subsequent to the failure of the first reverse mode rupture disk 12.

The embodiment of FIGS. 1-3 and the embodiment of FIG. 4 operate in a manner similar to that of the first reverse mode rupture disk 12 just described. The embodiments of FIGS. 1-4 would be used only where there was no likelihood of a pressure occurring in zone 400 higher than the pressure in second zone 402.

The embodiment of FIG. 7 would be used where both the normal mode design rupture pressure and the reverse mode design rupture pressure were very low, and is essentially two of the apparatus 10 of FIG. 1 placed face to face, but using only a single sealing membrane.

The present invention provides a much lower predictable minimum rupture pressure than do the safety pressure relief devices of the prior art. The prior art is exemplified by U.S. Pat. No. 2,953,279 to Coffman and U.S. Pat. No. 3,091,359 to Wood. A comparison of the present invention to the apparatus of the Coffman '279' patent illustrates the magnitude of the improvement provided by the present invention. Considering, for example, two inch nominal diameter rupture disk assemblies, the minimum rupture pressures of the Coffman '279' patent apparatus and the present invention are given by the following table for given thicknesses of the flexible sealing membrane.

| Thickness of Sealing Membrane | Min. Rupture Pressure of Coffman '279' | Min. Rupture Pressure of FIG. 1 |
| --- | --- | --- |
| 0.005 inch | 15.0 psi | 4.0 psi |
| 0.003 inch | 10.0 psi | 3.0 psi |
| 0.002 inch | 7.5 psi | 2.5 psi |
| 0.001 inch | 5.0 psi | 2.0 psi |

As is shown by the preceeding table, the minimum rupture pressure is decreased greatly by the present invention.

Thus, the safety pressure relief device of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A safety pressure relief device comprising:
   a flexible sealing member;
   a knife means, including:
      a cutting blade located about the periphery of a substantially circular opening formed in said knife means;
      a flange portion located radially outward of said cutting blade; and
      an annular connecting portion between said flange portion and said cutting blade;
   a first rupture disk having said flexible sealing member associated with one side thereof and having said knife means located adjacent a side thereof opposite said flexible sealing member so that when said first rupture disk ruptures in response to a predetermined pressure differential caused by a first pressure on the sealing member side of said first rupture disk being a predetermined amount greater than a second pressure on the knife means side of said first rupture disk, said flexible sealing member engages said knife means, said first rupture disk including:
- a plurality of arcuate slots located radially outward of said cutting blade and defining a substantially circular blowout portion therein and a retaining hinge thereon, said blowout portion being constructed for dislocation from said first rupture disk and passage through said opening in said knife means so that an opening, through which a portion of said sealing member extends to contact said knife means after rupture of said first rupture disk, is created in said first rupture disk when said first rupture disk ruptures; and
- at least one rupture tab located between adjacent arcuate slots and having a notch therein; and
- a second rupture disk associated with said flexible sealing member so that said sealing member is located between said first and second rupture disks.

2. A safety pressure relief device comprising:
a flexible sealing member;
a knife means having a substantially circular opening with a cutting blade located about the periphery thereof;
a first, flat plate rupture disk including an aperture disposed therein so that a pressure differential on the side of said relief device adjacent said first rupture disk may be communicated to said flexible sealing member, said aperture comprising:
- a plurality of arcuate slots defining a substantially circular blowout portion for dislocation from said first rupture disk and passage through said opening in said knife means;
- a retaining hinge; and
- a rupture tab located between adjacent arcuate slots, said rupture tab having a notch therein;

said first rupture disk having said flexible sealing member oriented therewith so that a portion of said sealing member extends through an opening in said first rupture disk created by the dislocation of said blowout portion to contact said knife means after rupture of said first rupture disk and said first rupture disk further having said knife means located adjacent a side thereof opposite said flexible sealing member so that when said first rupture disk ruptures in response to a predetermined pressure differential caused by a first pressure on the sealing member side of said first rupture disk being a predetermined amount greater than a second pressure on the knife means side of said first rupture disk, said flexible sealing member engages said knife means; and a second rupture disk including a concave-convex portion having a plurality of radially extending slits disposed therein with the concave surface of said concave-convex portion positioned adjacent said flexible sealing member so that said flexible sealing member is located between said first and second rupture disks, said flexible sealing member being oriented between said first and second rupture disks so that said sealing member is urged towards a first position engaging and coextensive with said second rupture disk when a pressure differential on the side of the relief device adjacent said first rupture disk is communicated to said sealing member through the aperture in said first rupture disk and said second rupture disk having disposed therein an aperture so that a pressure differential on the side of said relief device adjacent said second rupture disk may be communicated to said flexible sealing member to urge said flexible sealing member towards a second position engaging and coextensive with said first rupture disk.

3. The safety pressure relief device of claim 2, further comprising:
- a protection element, located between said second rupture disk and said flexible sealing member, to prevent said flexible sealing member from contacting said second rupture disk.

4. A safety pressure relief device comprising:
- a first flat plate rupture disk having an outer flange portion and having a plurality of arcuate slots positioned interiorly of said outer flange portion defining a substantially circular blowout portion, a retaining hinge, and a plurality of rupture tabs located between adjacent arcuate slots;
- a second rupture disk having a concave-convex portion connected to a radially outer flange portion, the concave-convex portion including a plurality of radially extending slits disposed therein and the concave surface of said concave-convex portion facing said first rupture disk;
- a flexible sealing member located between said first and second rupture disks and constructed for movement from a first position adjacent and coextensive with said second rupture disk to a second position adjacent and coextensive with said first rupture disk; and
- knife means located adjacent a side of said first rupture disk opposite said flexible sealing member so that when said first rupture disk ruptures in response to a predetermined pressure differential caused by a first pressure on the sealing member side of said first rupture disk being a predetermined amount greater than a second pressure on the knife means side of said first rupture disk, said flexible sealing member engages said knife means, said knife means including a substantially circular opening having a cutting blade disposed about the periphery thereof, a radially outer flange portion, and an annular connecting portion between said flange portion and said cutting blade, said connecting portion being orientated so that said arcuate slots of said first rupture disk are located radially outward of said cutting blade.

5. The safety pressure relief device of claim 4 further comprising a protection element located between said second rupture disk and said flexible sealing member.

* * * * *